United States Patent

Meissner

[15] 3,640,127
[45] Feb. 8, 1972

[54] PROCESS AND APPARATUS FOR THE DETERMINATION OF STRESS-STRAIN RELATIONSHIPS OF SOLIDS AND VISCOUS LIQUIDS, ESPECIALLY OF MATERIALS IN THE VISCOELASTIC STATE

[72] Inventor: Joachim Meissner, Fussgoenheim, Germany

[73] Assignee: Badische Anilin & Soda-Fabrik Aktiengesellschaft, Ludwigshafen/Rhineland Theinland-Pfalz, Germany

[22] Filed: Apr. 30, 1970

[21] Appl. No.: 33,305

[30] Foreign Application Priority Data

May 2, 1969 Germany..................P 19 22 414.7

[52] U.S. Cl..................................73/95.5, 73/15.6, 73/169
[51] Int. Cl............................................G01n 3/08

[58] Field of Search..................73/95.5, 95, 15.6, 143, 159, 73/160, 169

[56] References Cited

UNITED STATES PATENTS 3,474,666  10/1969  Litzler ................................73/95.5

Primary Examiner—Jerry W. Myracle
Attorney—Johnston, Root, O'Keeffe, Keil, Thompson & Shurtleff

[57] ABSTRACT

A process for determining the elastic and irreversible plastic parameters of materials of consistencies ranging from doughy to molten at a constant rate of extension, and an apparatus for carrying out said process in which two pairs of wheels separated by a predetermined distance act on a bar-shaped test specimen at a constant peripheral speed and in which molten specimens are supported by the surface of a liquid.

14 Claims, 11 Drawing Figures

PROCESS AND APPARATUS FOR THE DETERMINATION OF STRESS-STRAIN RELATIONSHIPS OF SOLIDS AND VISCOUS LIQUIDS, ESPECIALLY OF MATERIALS IN THE VISCOELASTIC STATE

The invention relates generally to a process and apparatus for determining the mechanical properties of solid and doughy to molten materials and relates especially to the determination of the tensile characteristics of such materials at a constant rate of extension.

For the measuring of stress-strain diagrams in tensile tests on materials, it is known to fasten a bar-shaped specimen between two clamps and to increase the distance between the two clamps at a constant velocity, i.e., to stretch the sample at a constant rate and thus enable the force-time diagram to be drawn, from which in turn the stress-strain diagrams can be obtained. This method of testing is satisfactory for small total deformations, and may also be used for medium deformations, if the stress-strain properties of the sample are independent of the rate of deformation. In the case of large deformations, the maximum length of the testing machine sets a limit which cannot be exceeded without difficulty.

In testing viscoelastic materials, whose stress-strain properties are dependent on time or the deformation rate, the tensile tests must be carried out at a constant rate of extension. This requirement cannot be met by a constant speed of drawing apart, since although the sample length increases at a rate proportional to time, the deformation per unit time decreases steadily on account of the increasing base length on which it is calculated. Thus, with large extensions, the differential extension has to be related to the length present at the particular time referred to, and not to the initial length (Hencky's extension index). The extension index referring to the initial length is known as the technical extension or Cauchy's extension index. In the case of Hencky's extension index therefore, the rate of extension $$\dot{\epsilon} = d\epsilon/dt = 1/l \cdot dl/dt$$

and $$\epsilon = \int_{l_o}^{l} dl/l = \log_n(l/l_o)$$

Consequently, with a constant speed of drawing apart, the extension rate $\dot{\epsilon}$ steadily decreases; for example, with a 10-fold extension of the sample the extension rate decreases to one-tenth of its original value.

Furthermore it has hitherto been practically impossible to investigate exactly the tensile characteristics of a viscoelastic liquid such as a molten plastics material, because the transmitting of forces to such materials cannot be reliably accomplished by means of clamps.

It is an object of the present invention to provide a process for applying force with sufficient reliability to both solid and viscoelastic specimens. Another object of the present invention is to separate the total extension into a viscous irreversible part and into a rubber-elastic reversible part. Since for the result the speed of deformation is obviously critical significance, a further object of this invention resides in the determination of the mechanical deformation relationships (stress-strain relationships) under purely tensile loads with a predetermined rate of extension. Yet another object of this invention is to provide a method of applying loads to a viscous sample between two horizontally arranged points of application while avoiding systematic errors (e.g., those due to gravitational forces).

These objects are achieved by the process according to the present invention which consists measuring, as a function of time, the tensile forces applied to a bar-shaped specimen, the distance between the points of application of said forces and the predetermined rate of extension being constant.

According to a further feature of the invention a viscous specimen to be stressed is supported by the boundary layer of another substance, advantageously by buoyancy in a bath of liquid, so that the points of application of the force lie on or near the surface of the liquid.

An apparatus according to the present invention for carrying out the process is characterized by two pairs of rollers or toothed wheels which during the determination can be driven in opposite directions at a predetermined constant peripheral speed.

Further features of the invention will be evident from the following description with reference to the drawings which show diagrammatically apparatus for carrying out the process of the invention.

Figure 1:
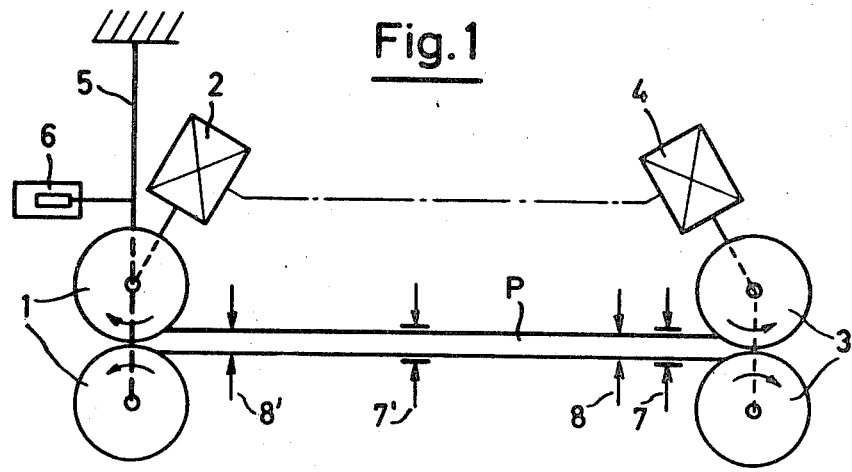
FIG. 1 shows a test specimen being stressed in tension between driven pairs of wheels.
Figure 2:
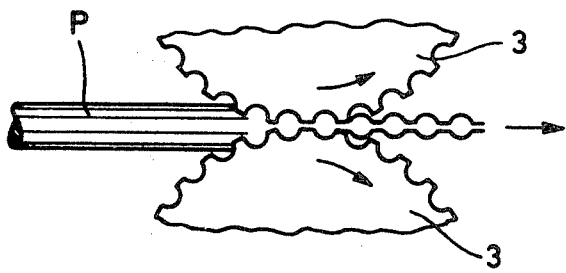
FIG. 2 shows details of the wheel-pair gripping means.

In FIG. 1 the bar-shaped test specimen marked P is inserted horizontally between a pair of wheels 1 driven by a motor 2 and a pair of wheels 3 driven by a motor 4. A constant rate of deformation is ensured by the fact that the distance between the two wheel pairs is constant and the wheel pairs 1 and 3 are driven during the experiment with constant speeds of rotation $n_1$ and $n_3$, respectively. Moreover, between driving motors 2 and 4 there may be provided a disengageable connection which guarantees synchronism. The drives for the wheel pairs 1 and 3, with the driving motors being controlled independently, may be so designed that, for example, the rotation speed $n_1$ can be adjusted to the limiting value $n_1=0$ so that the specimen is stressed only by the driven wheel-pair 3. The wheel pair 1, together with its driving motor 2, preferably a synchronous motor, is suspended at the free end of a firmly attached spring 5, which, when specimen P is subjected to tensile stress, is deflected by a small amount. This deflection is measured by known means, e.g., by an inductive displacement pickup 6 and an amplifier, or by means of a wire strain gauge. The force deflecting the pickup 6 is proportional to the tensile force applied to the specimen P. The force-time diagram can be drawn by a recording instrument. In order to ensure that, during the testing of molten plastics material, the peripheral velocities of the wheel pairs 1 and 3 are transmitted without slippage to the sample at the gripping points and that the viscous specimen leaves the nip the wheel pair without adhering to the latter after passing the gripping points, each wheel is formed as a kind of sprocket wheel, and the two wheels of each pair are arranged (as shown in FIG. 2) so as not to mesh with each other, the apex of tooth of one wheel facing the apex of a tooth of the other wheel, the two apices almost touching each other.

The measuring arrangement according to the invention also makes it possible to measure the relaxation and retardation properties of viscoelastic substances. The determination of these characteristics of a substance is carried out by securing, at a given point of time during the tensile test with an apparatus according to FIG. 1, the strand-shaped specimen P between a pair of clamps 7 located near the wheel pair 3 and switching off the motor 2 at the same time. The pair of clamps 7' can be used in the same way. By means of the pickup 6, the residual tensile strength of the specimen is measured as a function of time. This decay function serves for assessing the relaxation characteristics.

The measuring apparatus according to the invention can also be used for the determination of other characteristics. For this purpose two severing devices 8 and 8' are provided, which, simultaneously and in the shortest possible time, cut through the strand-shaped specimen, the cuts being in planes at right angles to the direction of tension. If the tensile test is interrupted by the severing of the specimen P at points 8 and 8', then the section of the specimen between the cutting points will subsequently shorten appreciably. The total shortening corresponds to the rubber-elastic recovery. In this manner, the elastic and viscous parts of the total deformation can be determined from the total deformation of the specimen at the moment of separation. Furthermore, the recovery from the deformation can be measured as a function of time, so that the retardation properties of the specimen can be assessed. Finally, the arrangement according to the invention makes it possible to carry out simultaneously on one specimen relaxation and retardation measurements if simultaneously the specimen is fixed at the clamping position 7 and cut at the severing point 8 and, if desired simultaneously at several further points 8', 8'' and the motor 2 is switched off.

The apparatus shown schematically in FIG. 1 is suitable, without additional means, for measuring the various characteristics of solid and viscoelastic materials; care must however be taken to ensure, during the determinations, that the deformation of the sample is homogeneous, i.e., uniform over the whole length between the gripping points, and that necking or local constrictions do not occur. This check for homogeneity of the deformation may be carried out using several severing points 8, 8', 8'' in the measuring section. For the determination of the characteristics of viscoelastic liquids, e.g., polymer melts, the action of gravity on the sample P must be neutralized. For this purpose, the apparatus for carrying out the process is advantageously arranged above the surface of a liquid contained in a tank or long trough. The wheel pairs 1 and 3 dip into the liquid to such an extent that the force application points lie at the level of the specimen P. The specimen P itself is supported by the buoyancy of the liquid. The liquid bath may at the same time be used for thermostating the specimen. The liquid should be so chosen that its density at the temperature at which the measurements are to be made is slightly greater than the density of the material to be tested at the same temperature. The specimen will then extend only slightly above the liquid surface. The height of the liquid is adjusted before the measurement so that, when the measuring temperature has been attained, it is on a level with the tangents at the points on the peripheries of the wheel pairs 1 and 3 which almost touch each other. Furthermore, the liquid of the bath must not, during the course of the experiment, diffuse into the material being tested. When testing polyethylene melts, this can be done for example by means of certain silicone oils.

Figure 3:
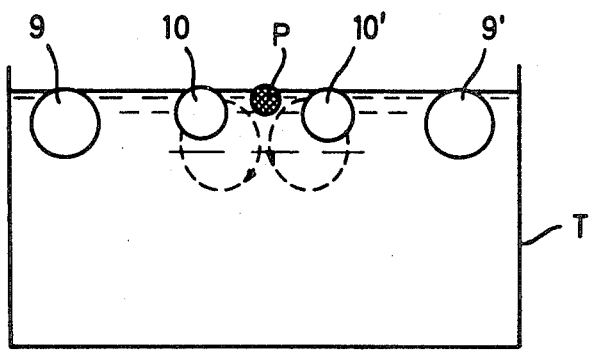
FIG. 3 shows a specimen-heating arrangement.

With the liquid bath for the support and thermostating of the bar-shaped specimen a further requirement is met in a simple manner. For accurate measurements one must avoid the stretching of the specimen when it is held in position at the liquid surface before the application of the tensile forces. This is especially important for retardation measurements, because the length measurements of the specimen undergoing retardation with time at the surface of the liquid can then be easily accomplished. The necessary centering is achieved by means of slight thermal convection currents in the liquid bath, which can be produced by a specific arrangement of the heating elements in the bath. FIG. 3 is a diagrammatic cross section through the through $\tau$ containing the liquid and through the heating elements. The specimen P is situated approximately in the middle of the surface of the trough. Located symmetrically with respect to the specimen P, near the walls of the trough, are the main heating elements 9, 9' in which the heat supply may be electrical or by means of pipes which may be filled for example with thermostatically heated oil. Also located symmetrically with respect to the specimen P inside the trough $\tau$ are two further heating elements 10 and 10', which provide fine control of the temperature at the surface of the bath and hence of the temperature of measurement. The heating elements 10 and 10' produce slight thermal convection currents in the liquid bath which are represented in FIG. 3 by ellipses in dashed lines provided with arrows. These convection currents are sufficient to center the specimen P floating at the surface of the bath between the heating elements 10 and 10'. At higher measuring temperatures, e.g., 150° C. and above, it is recommended to cover the trough $\tau$ with a glass plate to reduce loss of heat from the surface of the liquid.

Figure 4:
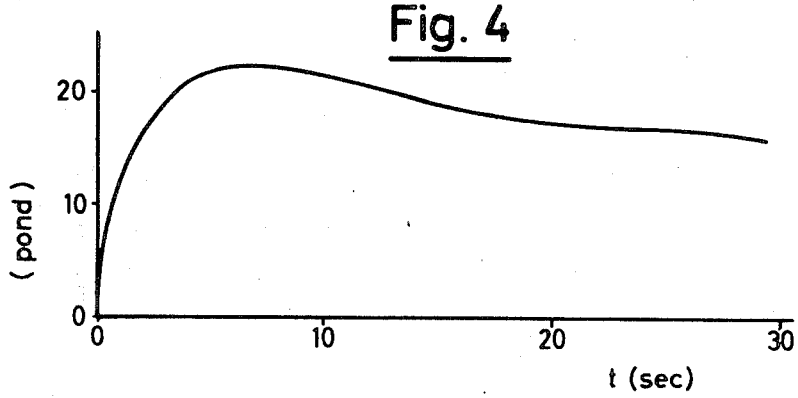
FIGS. 4–11 show various curves of tensile properties plotted from tests made by the test device of FIG. 1.
Figure 5:
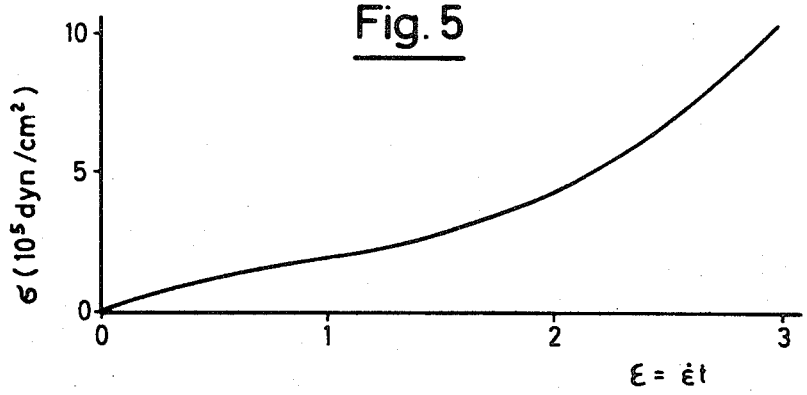
Figure 6:
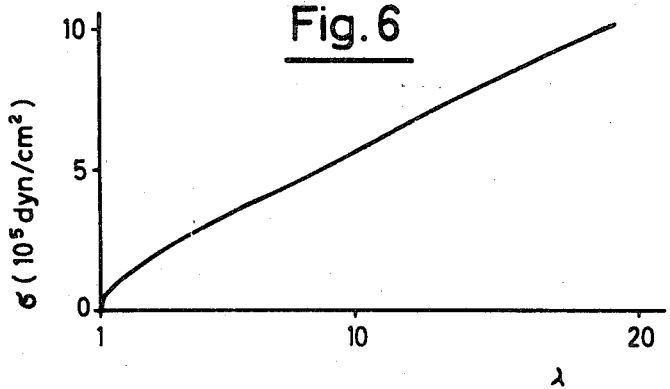

In FIGS. 4, 5 and 6 are shown qualitatively and diagrammatically the characteristics obtainable by measurements using the arrangements of FIGS. 1–3 in tensile tests on a branched polyethylene having a melt index of 0.5, at a stretching speed of $\dot{\epsilon}=0.1$ sec$^{-1}$ and a measuring temperature of 150° C. The distance between the wheel pairs 1 and 3 was 730 mm., and the initial cross-sectional sectional area of the specimen P was 29.4 mm.$^2$. FIG. 4 shows a force-time diagram so obtained. FIG. 5 shows the stress-strain diagram obtained from it, in which the stress $\sigma$ is based on the actual and steadily changing cross section and the strain $\epsilon = \dot{\epsilon} \cdot t$ is given according to Hencky. FIG. 6 shows the usual graph of the tensile stress $\sigma$ plotted against the stretching ratio $\lambda$, in which $\sigma$ is again based on the actual, and not on the original cross section.

Figure 7:
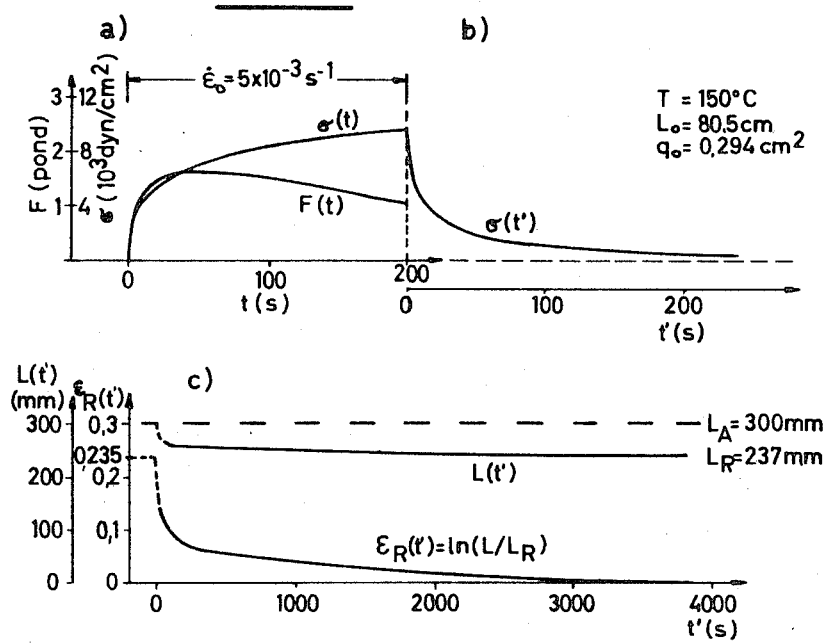

In FIGS. 7 to 11, examples of measurements are shown which illustrate the versatility and quantitative efficiency of the measuring process. FIG. 7 shows in part (a) the measured force-time diagram F ($t$Figure). which is obtained when stretching a melt of branched polyethylene (LDPE) having a melt index of 1.7 at 150° C. and at a rate of extension $\dot{\epsilon}_0$=0.005 sec$^{-1}$. The total deformation time amounts to 200 seconds. Finally the relaxation of the stress and the retardation of the strain is obtained (as is apparent from parts $b$ and $c$ of FIG. 7) using the clamping position 7' and a knife 8 as illustrated diagrammatically in FIG. 1. The time following the stretching process is designated as the "decay time" $t'$. The initial dimensions of the specimen are marked on FIG. 7.

From the course of the force F ($t$) there was calculated, with reference to the cross section at the particular time, the course of the stress $\sigma$ ($t$). By conversion of the function $\sigma$ ($t$) into $\sigma$ ($\epsilon$) with $\epsilon=\dot{\epsilon}_0 t$ the stress-strain diagram is obtained. From the decay characteristics of the course of the stress ($t'$) after the stretching operation inferences, about the relaxation properties of the material can be drawn (part $b$ of FIG. 7). Similarly, the recovery of the specimen portion $L_4$ (severed at the end of the stretching process) due to the action of the rubber elasticity of plastics melts is observed as a function of time. From the function L ($t'$) the elastic part of the deformation $\epsilon_{R(t')}$ is obtained (part $c$ of the FIG.). The recoverable tensile strain is designated $\epsilon_R$.

Figure 8:
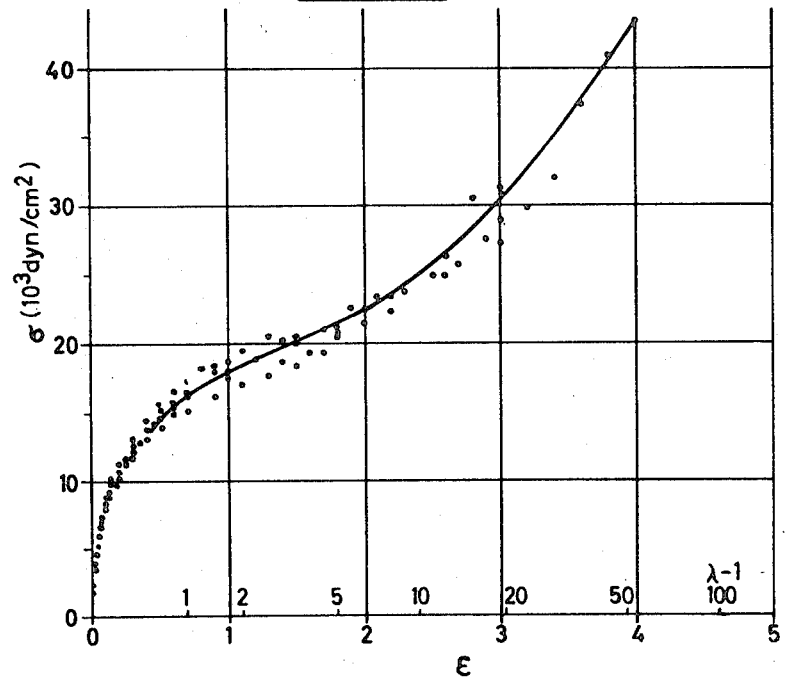

FIG. 8 shows the stress-strain diagram of the same material with $\epsilon_0$=0.001 sec$^{-1}$. For this purpose several series of measurements were carried out with various total extensions in order to test the reproducibility of the various results and to ascertain the dependence of the elastic part $\epsilon_R$ of the strain upon the total deformation $\epsilon$. The values $\epsilon_R$ are marked on FIG. 8 as indicated by the arrows. On the ordinate, the Hencky strain index is shown as a linear scale, and above it the Cauchy strain index normally used in industry is shown. it can be seen that according to the process of the invention, total extensions $\lambda$ of over 50 can be obtained.

Figure 9:
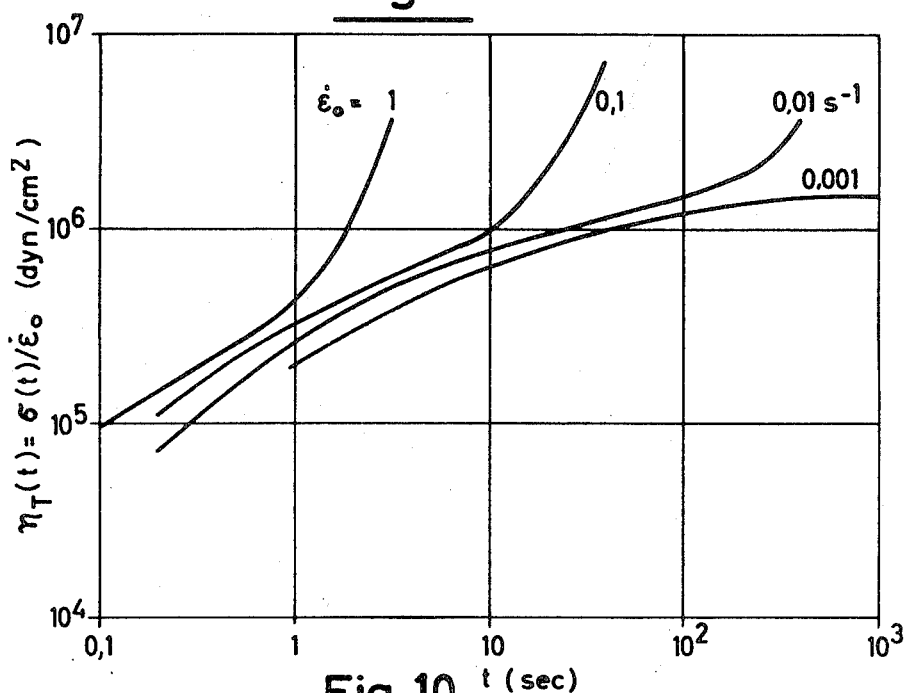
Figure 10:
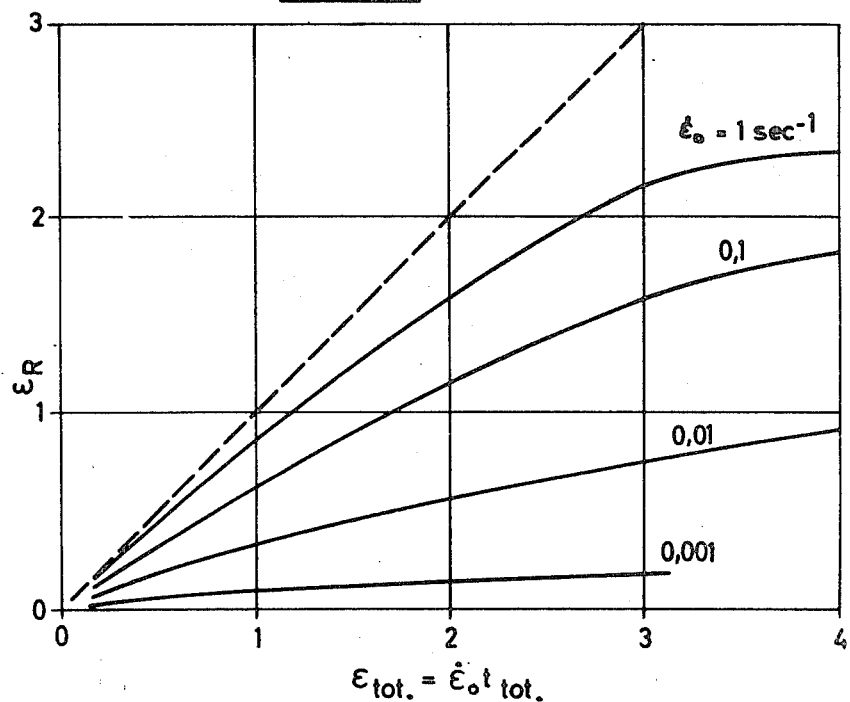

If the tensile properties at different rates of extension are to be compared, then the time dependence of the tensile viscosity $\eta_T$ ($t$)=$\sigma(t)/\dot{\epsilon}_0$ should be ascertained. This function is measured for a different branched polyethylene having a melt-index of 1.4 at rates of extension between $\dot{\epsilon}_0$=10$^{-3}$ and $\dot{\epsilon}_0$=1 sec$^{-1}$. It is represented in FIG. 9 on a double logarithmic scale. This example illustrates that according to the invention measurements on plastics melts can be carried out at a wide range of rates of extension. The elastic part $\epsilon_R$ of the strain obtained at the same time in these measurements is shown in FIG. 10. Here it can be seen that when $\dot{\epsilon}_0$=1 sec$^{-1}$ the total extension is almost completely reversible, i.e., is rubber-elastic, so that the $\epsilon_R$-value at this extension speed almost reaches the dashed 45° line. With decreasing stretching speeds the reversible part becomes appreciably smaller.

Figure 11:
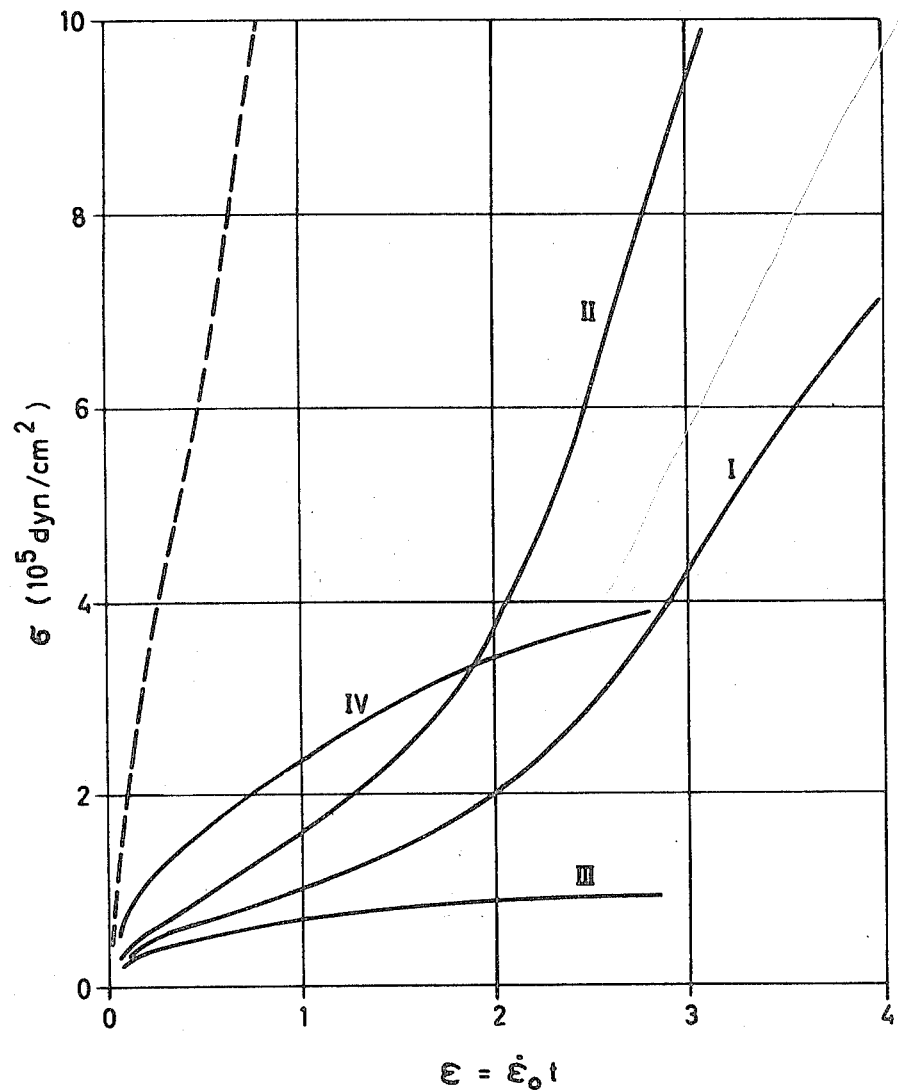

Finally FIG. 11 shows the stress-strain diagram with $\epsilon_0$=0.1 sec$^{-1}$ for various polymers:

I: Branched polyethylene (LDPE) having a melt-index of 1.4 at 150° C.

II: Branched polyethylene (LDPE) having a melt-index of 0.7 at 150° C.

III: Linear polyethylene (HDPE) having a melt-index of 1.3 at 150° C.

IV: Polystyrene at 180° C.

The curve shown in FIG. 11 as a dashed line was obtained for a crude rubber mixture at 80° C. and a stretching speed of $10^{-3} \text{sec}^{-1}$.

I claim:

1. A method for determining the viscoelastic tensile properties of viscoelastic liquid or solid materials, particularly the stress-strain relation measured at a constant extensional strain rate, which comprises subjecting a bar-shaped specimen of said viscoelastic material of constant cross section to tensile forces by stretching said specimen at a constant rate of extension directly between two points of tensile force application maintained at a constant distance apart, and measuring the tensile forces in said specimen as a function of time during the stretching thereof.

2. A method as claimed in claim 1, said tensile forces being measured by small amounts of deflection of one of said points of tensile force application.

3. A method as claimed in claim 1, said specimen being stretched by drawing it in opposite directions through nips of pairs of draw rollers which are rotatably driven in opposite directions.

4. A method as claimed in claim 2, said tensile forces being measured by small amounts of deflection of one of said pairs of draw rollers.

5. A method as claimed in claim 1, and floating said specimen on the surface of a liquid during the stretching thereof.

6. A method for determining the viscoelastic tensile properties of viscoelastic liquid or solid material, particularly the stress relaxation properties, which comprises subjecting a bar-shaped specimen of said viscoelastic material of constant cross section to tensile forces by stretching said specimen at a constant rate of extension directly between two points of tensile force application maintained at a constant distance apart, then stopping said stretching after fixing one end of the specimen, and measuring the residual tensile strength of the specimen as a function of time.

7. A method for determining the viscoelastic tensile properties of viscoelastic liquid or solid material, particularly the time dependent recoverable section of total strain, which comprises subjecting a bar-shaped specimen of said viscoelastic material of constant cross section to tensile forces by stretching for a predetermined time interval said specimen between two points of tensile force application maintained at a constant distance apart, severing said specimen at two points between said points of tensile forces application and thereafter measuring the length of the severed portion of the specimen to ascertain its time dependent elastic recovery.

8. An apparatus for determining tensile properties of bar-shaped specimens which comprises two, spaced pairs of rollers respectively having between pairs of rollers nips in which a bar-shaped specimen may be gripped, means for rotatably driving at least one of said pairs of rollers in a specimen-stretching direction of rotation, means resiliently supporting one of said pairs of rollers, means fixedly but rotatably supporting the other pair of rollers, and means for measuring the deflection of the resiliently supported pair during the stretching of said specimen.

9. Apparatus as claimed in claim 8, and at least one clamping means between said pairs for gripping the specimen tightly during stretching thereof.

10. Apparatus as claimed in claim 8, and at least one specimen-severing means between said pairs for severing the specimen at one or more points during stretching thereof.

11. Apparatus as claimed in claim 8, a tank containing a body of liquid adapted to buoyantly support said specimen on the surface of said liquid, and said pairs of rollers being suspended in said tank with the nips thereof at the surface of said liquid.

12. An apparatus as claimed in claim 11, and heaters positioned in said tank symmetrically with respect to said pairs of rollers for heating said liquid.

13. An apparatus as claimed in claim 12 wherein said heaters are positioned adjacent the surface of said liquid.

14. An apparatus as claimed in claim 12 wherein said heaters comprise a first pair of heaters respectively near opposite walls of said tank and a second pair of heaters near to and on opposite sides of the place where said specimen is to be floated on the surface of said liquid, said first pair of heaters having a larger heating capacity than said second pair of heaters.

* * * * *